United States Patent
Ashizawa et al.

(10) Patent No.: US 7,136,737 B2
(45) Date of Patent: *Nov. 14, 2006

(54) COORDINATED BRAKE CONTROL SYSTEM

(75) Inventors: Hiroyuki Ashizawa, Kanagawa (JP);
Kazuhiko Tazoe, Kanagawa (JP);
Hideo Nakamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 241 days.

This patent is subject to a terminal disclaimer.

(21) Appl. No.: 10/732,310

(22) Filed: Dec. 11, 2003

(65) Prior Publication Data

US 2004/0122579 A1 Jun. 24, 2004

(30) Foreign Application Priority Data

Dec. 17, 2002 (JP) ............................. 2002-365210

(51) Int. Cl.
*G06F 7/70* (2006.01)
(52) U.S. Cl. ........................... 701/70; 701/78; 701/83; 303/20; 303/152; 303/155; 903/947
(58) Field of Classification Search .................. 701/1, 701/22, 70–71, 78–79, 81, 83; 303/2–3, 303/13, 15–16, 20, 151–152, 154–155, 114.1, 303/115.2; 903/947, 920, 922
See application file for complete search history.

(56) References Cited

U.S. PATENT DOCUMENTS

| | | | | |
|---|---|---|---|---|
| 5,322,352 A | * | 6/1994 | Ohno et al. ..................... 303/3 |
| 5,927,829 A | * | 7/1999 | Saga et al. .................... 303/152 |
| 6,244,674 B1 | * | 6/2001 | Kuno et al. ................... 303/152 |
| 6,439,674 B1 | * | 8/2002 | Niino .......................... 303/152 |
| 6,454,364 B1 | * | 9/2002 | Niwa et al. ................... 303/152 |
| 6,735,511 B1 | * | 5/2004 | Nakamura et al. ............. 701/70 |
| 6,813,553 B1 | * | 11/2004 | Nakamura et al. ............. 701/70 |
| 6,910,747 B1 | * | 6/2005 | Tsunehara .................... 303/152 |
| 6,957,870 B1 | * | 10/2005 | Kagawa et al. ........... 303/113.4 |
| 6,957,874 B1 | * | 10/2005 | Hara et al. ................... 303/152 |
| 2003/0173826 A1 | | 9/2003 | Tazoe et al. ................. 303/152 |
| 2003/0182044 A1 | | 9/2003 | Nakamura et al. ............ 701/70 |

FOREIGN PATENT DOCUMENTS

JP 2000-225932 A 8/2000

* cited by examiner

*Primary Examiner*—Gertrude A. Jeanglaude
(74) *Attorney, Agent, or Firm*—Foley & Lardner LLP

(57) ABSTRACT

A coordinated brake control system is for a hybrid brake system including a regenerative brake unit and a friction brake unit for a vehicle and is arranged to generate a total braking torque which is a combination of a regenerative braking torque generated by the regenerative brake unit and a friction braking torque generated by the friction brake unit, so as to bring the total braking-torque closer to a target braking torque, and to limit a rate of change of the regenerative braking torque according to a response delay of the friction braking torque when a first distribution ratio of the generative braking torque relative to the total braking torque is decreased and when a second distribution ratio of the friction braking torque relative to the total braking torque is increased.

8 Claims, 12 Drawing Sheets

SLOW DECELERATION

QUICK DECELERATION

COORDINATED BRAKE CONTROL SYSTEM

BACKGROUND OF THE INVENTION

The present invention relates to a coordinated brake control system of a hybrid brake system having a regenerative brake unit and a friction brake unit, and more particularly to a coordinated brake control system which is capable of smoothly transiting a braking from a regenerative braking to a friction braking.

Japanese Patent Provisional Publication No. 2000-225932 discloses a coordinated brake control system which is arranged to calculate a target barking torque according to vehicle driving and traveling conditions and to achieve the target braking-torque by a combination of a regenerative braking and a friction braking of a hybrid brake system. The hybrid brake system comprises a regenerative brake unit which generates a braking torque by converting a wheel rotating energy into electric power using a motor/generator and a friction brake unit which generates a braking torque by hydraulically or electro-magnetically operating a friction brake device.

When this coordinated brake control system generates a master cylinder hydraulic pressure Pmc at a moment t2 in FIGS. 12A through 12E in reply to the depression of a brake pedal, a regenerative braking-torque is mainly produced for a period of a relatively high vehicle speed range from the moment t1 to a moment t2 during when it is possible to accurately execute the regenerative braking so as to improve a fuel consumption by improving an energy recovery rate while suppressing a friction braking torque. Thereafter, when vehicle speed VSP becomes a relatively low vehicle speed at the moment t2 and later, the regenerative braking-torque command value is gradually decreased according to the lowering of the vehicle speed VSP as shown by a continuous line in FIG. 12C, and simultaneously a braking hydraulic pressure command value corresponding to friction braking torque is gradually increased as shown by a dot and dash line in FIG. 12D. Finally, all of the braking becomes dependent on the friction braking torque at a moment t3, and the coordinated brake control is terminated at the moment t3.

This coordinated brake control system is arranged to keep a decreasing rate for decreasing the regenerative braking torque at a constant rate. Accordingly, even if the decreasing rate is varied, there is still caused the following problem at the moment t2 and adjacent thereof when a gradual decreasing of the regenerative braking torque is started. That is, the friction braking system poorly performs a responsibility of generating the braking-torque in reply to the received signal as compared with that of the regenerative braking system, and therefore the rising of the brake hydraulic pressure at a start from zero largely delays as compared with the standard response shown by a broken line determined based on the brake hydraulic pressure command value.

This delay of the initial rising causes a large difference between the standard response and the actual response of the hydraulic pressure during an early period of the hydraulic pressure rising. Although the actual hydraulic pressure is then quickly risen by the execution of a feedback control based on the difference so as to follow up the standard response as shown by a continuous line in FIG. 12D, the difference during the early period of this transition stage shown by hatching in FIG. 12D generates a shortage of the hydraulic pressure, and therefore there is a possibility that a driver has an impression that the transition from the regenerative braking to the friction baking is not smooth.

SUMMARY OF THE INVENTION

It is therefore an object of the present invention to provide an improved coordinated braking control system which enables the smooth transient from the regenerative braking to the friction braking.

An aspect of the present invention resides in a coordinated brake control system for a hybrid brake system including a regenerative brake unit and a friction brake unit for a vehicle. The coordinated braking control system comprises a controller arranged to generate a total braking torque which is a combination of a regenerative braking torque generated by the regenerative brake unit and a friction braking torque generated by the friction brake unit, so as to bring the total braking-torque closer to a target braking torque, and to limit a rate of change of the regenerative braking torque according to a response delay of the friction braking torque when a first distribution ratio of the generative braking torque relative to the total braking torque is decreased and when a second distribution ratio of the friction braking torque relative to the total braking torque is increased.

Another aspect of the present invention resides in a coordinated brake control system for a vehicle, which system comprises a vehicle braking detector detecting a braking intent of a driver, a regenerative brake unit which is capable of generating a regenerative braking torque, a friction braking unit which is capable of generating a friction braking torque, and a controller connected to the vehicle braking detector, the regenerative braking unit and the friction brake unit. The controller is arranged to determine a target braking torque according to the braking intent, to calculate first and second distribution ratios which represents distribution ratios of the total braking torque to the regenerative brake unit and the friction brake unit, respectively, to generate a total braking torque by dividedly producing the regenerative braking torque and the friction braking torque generated by the friction brake unit on the based the first and second distribution ratios, so as to bring the total braking torque closer to the target braking torque, and to limit a rate of change of the regenerative braking torque according to a generation delay characteristic of the friction braking torque during a period when the first distribution ratio is decreased and the second distribution ratio is increased.

A further aspect of the present invention resides in a method of controlling a hybrid brake system including a regenerative brake unit and a friction brake unit for a vehicle, which method comprises an operation of generating a total braking torque which is a combination of a regenerative braking torque generated by the regenerative brake unit and a friction braking torque generated by the friction brake unit, so as to bring the total braking-torque closer to a target braking torque; and an operation of limiting a rate of change of the regenerative braking torque according to a response delay of the friction braking torque when a first distribution ratio of the generative braking torque relative to the total braking torque is decreased and when a second distribution ratio of the friction braking to The other objects and features of this invention will become understood from the following description with reference to the accompanying drawings.

DETAILED DESCRIPTION OF THE INVENTION

Referring to FIGS. 1 through 9E, there is discussed a first embodiment of a coordinated brake control system for a hybrid brake system in accordance with the present invention.

Figure 1:
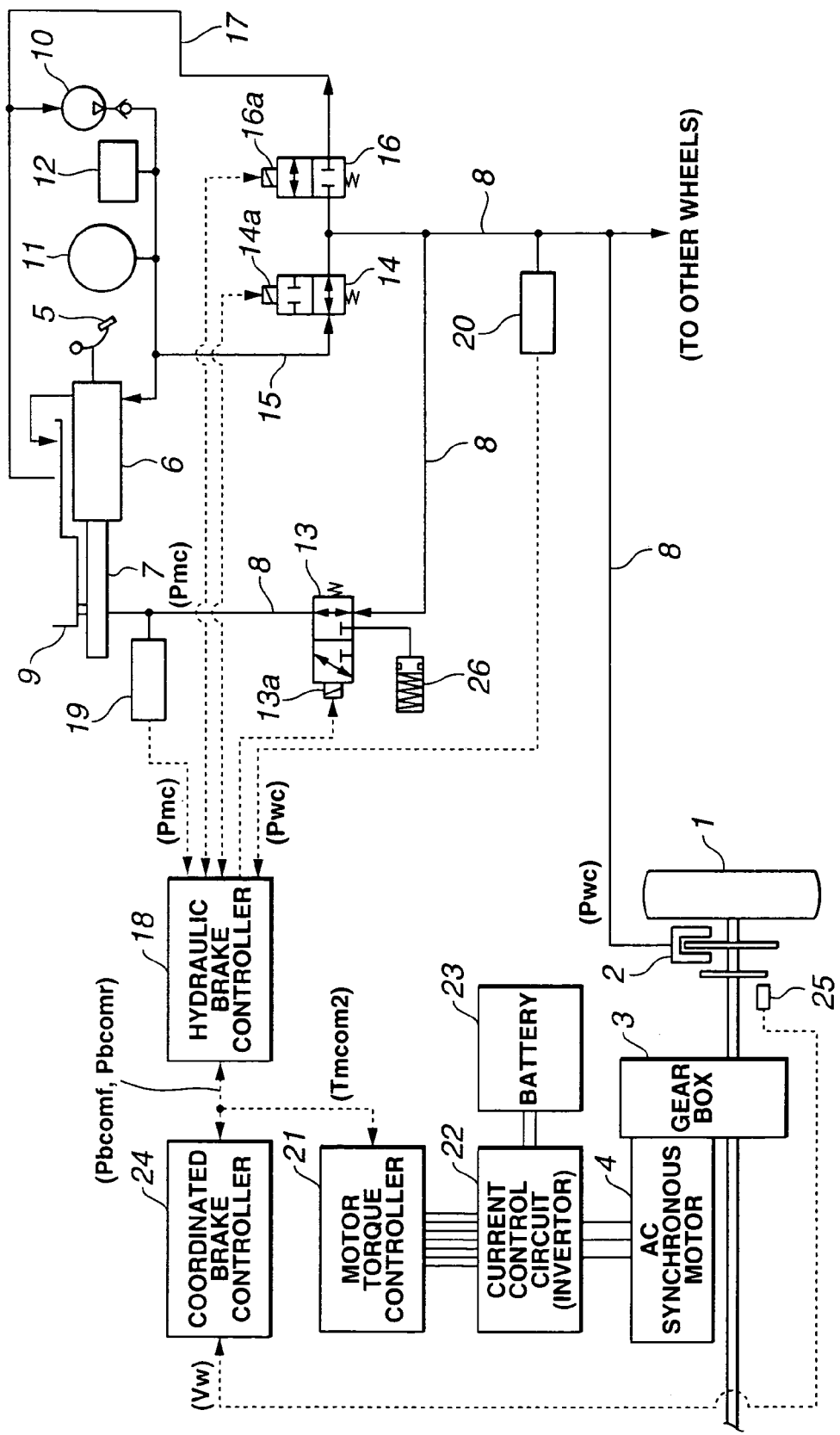
FIG. 1 is a schematic view showing a hybrid brake provided with a coordinated brake control system according to a first embodiment of the present invention.

FIG. 1 shows the hybrid brake system comprising the coordinated brake control system according to the first embodiment of the present invention. The hybrid brake system comprises a hydraulic brake unit of generating a braking torque (braking force) by supplying a hydraulic pressure to a wheel cylinder 2 provided for each driving wheel 1 (in FIG. 1, only one wheel is shown), and a regenerative brake unit of converting a wheel rotating energy into an electric power by means of an alternating-current (AC) synchronous motor 4 which is connected to driving wheel 1 through a gear box 3.

The coordinated brake control system for the hybrid brake system is arranged to effectively recover a regenerative energy by decreasing a braking hydraulic pressure to wheel cylinder 2 during when the braking torque (force) is mainly produced by the regenerative braking torque using AC synchronous motor 4.

First, there is discussed the hydraulic brake apparatus which does not exceed in a response characteristic as compared with the regenerative brake unit. When a brake pedal 5 is depressed according to the driver's braking intent, a depression force of brake pedal 5 is amplified by a hydraulic booster 6. The amplified depression force pushes a piston cup of a master cylinder 7, and therefore mater cylinder 7 outputs a master-cylinder hydraulic pressure Pmc corresponding to the depression force of brake pedal 5 toward a brake hydraulic conduit 8. Although FIG. 1 shows that brake hydraulic conduit 8 is connected only to wheel cylinder 2 of front drive wheel 1, it is of course obvious that brake hydraulic conduit 8 is connected to other wheel cylinders of other three wheels.

Brake fluid in a reservoir 9 is commonly used by hydraulic booster 6 and master cylinder 7 and serves as working fluid. Hydraulic booster 6 comprises a pump 10 which sucks brake fluid from reservoir 9 and discharges the brake fluid toward an accumulator 11 to store the pressurized fluid in accumulator 11. Further, the hydraulic pressure in accumulator 11 is controlled by a sequential control using a pressure sensor 12 provided in a conduit between pump 19 and accumulator 11.

Hydraulic booster 6 amplifies the depression force applied to brake pedal 5 using the hydraulic pressure in accumulator 11 as a pressure source, and presses the piston cup of mater cylinder 7 by means of the amplified depression force. Master cylinder 7 generates master-cylinder hydraulic pressure Pmc corresponding to the brake pedal depression force by pressingly packing the brake fluid supplied from reservoir 9 in brake conduit 8, and supplies wheel-cylinder hydraulic pressure Pwc to wheel cylinder 2 as a base pressure.

Wheel-cylinder hydraulic pressure Pwc is feedback controlled using the accumulator pressure in accumulator 11, as discussed later. In order to achieve this feedback control, an electromagnetic selector valve 13 is provided in brake hydraulic conduit 8, and a pressure increasing circuit 15 and a pressure decreasing circuit 17 are connected to a brake hydraulic conduit 8 at a position nearer to wheel cylinder 2 as compared with the position of electromagnetic selector valve 13. Pressure increasing circuit 15 extends from a discharging port of pump 10 and comprises a pressure increasing valve 14. Pressure decreasing circuit 17 extends from a suction port of pump 10 and comprises a pressure decreasing valve 16.

Electromagnetic selector valve 13 is a normal open valve, and therefore master-cylinder hydraulic pressure Pwc is increased by the pressure of accumulator 11 which is produced by the fluid communication with pressure increasing circuit 15 when electromagnetic selector valve 13 is in an off state corresponding to a normal open state. When a solenoid 13a of electromagnetic selector valve 13 is energized to close brake hydraulic circuit 8, master cylinder 7 is simultaneously communicated with a stroke simulator 26 to apply a hydraulic load corresponding (equal) to that of wheel cylinders 2 to master cylinder 7. This communication with stroke simulator 26 applies an operation feeling as same as that in the normal state to brake pedal 5.

Pressure increasing valve 14 is also a normal open valve and increases wheel-cylinder hydraulic pressure Pwc using the pressure of accumulator 11 by the communication with pressure increasing circuit 15 when put in the norm open state (de-energized). On the other hand, when a solenoid 14a of pressure increasing valve 14 is energized, increase of wheel-cylinder hydraulic pressure Pwc is stopped by shutting off the communication between brake hydraulic conduit 8 and pressure increasing circuit 15. Pressure decreasing valve 16 is a normal close valve which is closed when a solenoid 16a is de-energized. When solenoid 16a is energized, pressure decreasing circuit 16 is communicated with brake hydraulic conduit 8 so as to decrease wheel-cylinder hydraulic pressure Pwc.

When electromagnetic selector valve 13 is put in an open state so as to open brake hydraulic conduit 8, pressure increasing valve 14 and pressure decreasing valve 16 are put in a closed state so that pressure increasing circuit 15 and pressure decreasing circuit 17 are shut off from brake hydraulic conduit 8. Therefore, wheel-cylinder hydraulic pressure Pwc is determined from master-cylinder hydraulic pressure Pmc. Further, during when wheel-cylinder hydraulic pressure Pwc is increased or decreased by operating pressure increasing valve 14 or pressure decreasing valve 16, electromagnetic selector valve 13 is being turned on to shut off brake hydraulic conduit 8 so as not to be affected by master-cylinder hydraulic pressure Pmc.

Hydraulic brake controller 18 controls electromagnetic selector valve 13, pressure increasing valve 14 and pressure decreasing valve 16. Hydraulic brake controller 18 receives a signal indicative of master-cylinder hydraulic pressure Pmc from a pressure sensor 19 and a signal indicative of wheel-cylinder hydraulic pressure Pwc from a pressure sensor 20. Master-cylinder hydraulic pressure Pmc represents a braking-torque (force) demanded by a driver, and wheel-cylinder hydraulic pressure Pwc represents an actual value of a hydraulic braking torque.

AC synchronous motor 4 is drivingly connected to each driving wheel 1 through gear box 3, and is controlled by a motor torque controller 21. Motor torque controller 21 outputs three-phase PWM signal, and inverter (DC-AC inverting current control circuit) 22 inverts DC into AC and supplies the inverted AC to AC synchronous motor 4. When driving wheels 1 are driven by a driving torque (driving force) of motor 4, an electric power is supplied to motor 4 from a DC battery 23. When driving wheels 1 are braked by a braking torque (braking force) of motor 4, a vehicle motion energy is recovered in battery 23 by executing a regenerative braking-torque control.

As shown in FIG. 1, a hydraulic brake controller 18 and a motor torque controller 21 are networked with a coordinated brake controller 24. Hydraulic brake controller 18 controls the hydraulic brake unit according to the command signal from coordinated brake controller 24, and motor torque controller 21 controls the regenerative brake unit according to the command signal from coordinated brake controller 24. More specifically, motor torque controller 21 controls a regenerative braking torque generated by motor 4 on the basis of a regenerative braking-torque command value outputted from coordinated brake controller 24. When driving of driving wheels 1 is required, motor torque controller 21 executes the driving torque control using motor 4. Further, motor torque controller 21 calculates an allowable maximum regenerative braking-torque Tmmax of motor 4, which is determined based on a charged state and a temperature of battery 23, and outputs a signal corresponding to allowable maximum regenerative braking-torque Tmmax to coordinated brake controller 24.

Coordinated brake controller 24 receives the signal indicative of master-cylinder hydraulic pressure Pmc from pressure sensor 19 through hydraulic brake controller 18, the signal indicative of wheel-cylinder hydraulic pressure Pwc from pressure sensor 20 through hydraulic brake controller 18, and a signal indicative of a wheel speed Vw of driving wheels 1 from wheel speed sensors 25.

Figure 2:
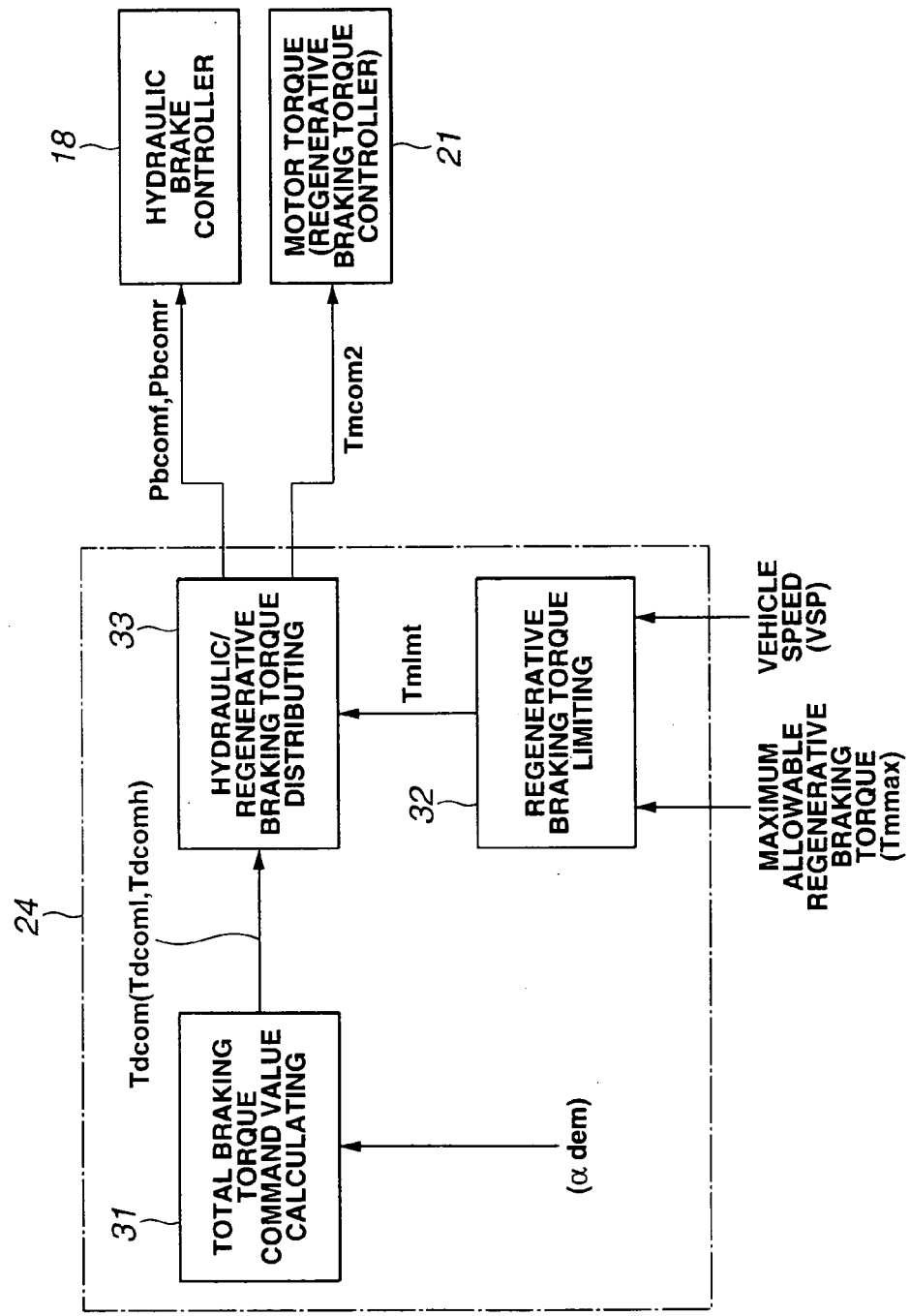
FIG. 2 is a block diagram showing controls executed by a coordinated brake controller of the coordinated brake control system shown in FIG. 1.
Figure 3:
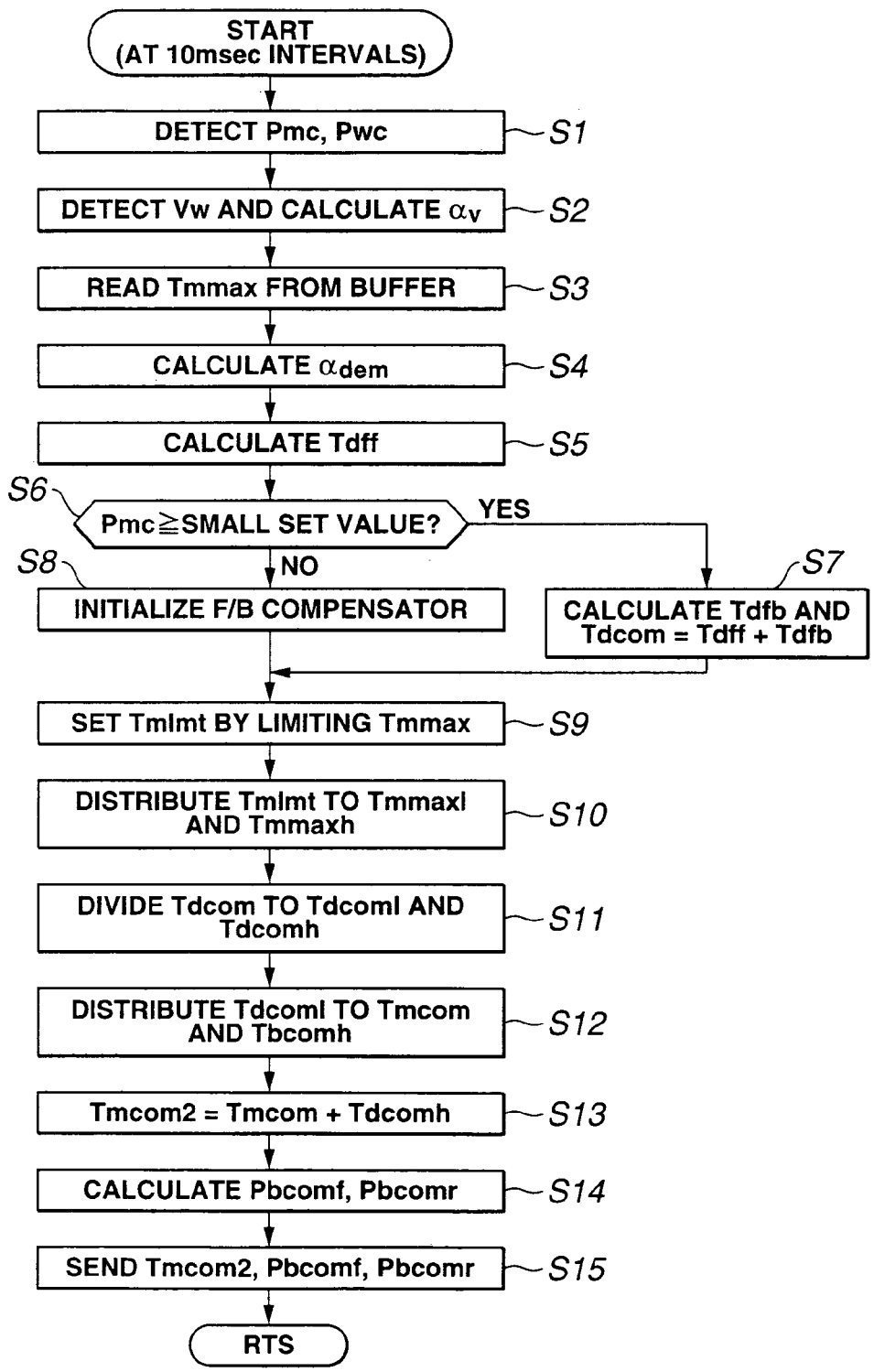
FIG. 3 is a flowchart showing a control program executed by the coordinated brake controller.

Coordinated brake controller 24 executes a coordinated brake control of the hybrid brake system by executing a processing based on the above input information, as shown by a block diagram in FIG. 2 and a flowchart in FIG. 3. FIG. 3 is a timer interruption processing executed at 1omsec intervals.

At step S1 controller 24 calculates (detects) master-cylinder hydraulic pressure Pmc and wheel-cylinder hydraulic pressure Pwc from the received information.

At step S2 controller 24 calculates (detects) a driving wheel speed Vw based on the received signal indicative of driving wheel speed Vw by each wheel and obtains the maximum value of the driving wheel speed Vw. Hereinafter, the maximum value is represented by Vw. Further, controller 24 calculates a driving-wheel deceleration $\alpha_v$ by executing a filtering processing of maximum driving wheel speed Vw using a band-pass filter represented by the following transfer function Fbpf(s).

$$Fbpf(s)=s/\{(1/\omega^2)s^2+(2\zeta/\omega)s+1\} \quad (1)$$

where s is Laplace operator. Actually, driving-wheel deceleration $\alpha_v$ is calculated using a recurrence formula obtained by discretizing the transfer function expressed by the expression (1) with Tustin (Biliner) approximation.

At step S3 controller 24 reads allowable maximum regenerative braking-torque Tmmax, which can be generated by motor 4, from a high-speed communication buffer between controller 24 and motor torque controller 21. As discussed above, motor torque controller 21 calculates allowable maximum regenerative braking-torque Tmmax according to the charged state of battery 23 and the like. For example, allowable maximum regenerative braking-torque Tmmax (driving wheel speed Vw) is varied according to vehicle speed VSP.

At step S4 controller 24 calculates a target deceleration $\alpha_{dem}$ of the vehicle using the following expression (2), master-cylinder hydraulic pressure Pmc and a constant K1 which has been determined according to vehicle specifications and previously stored in ROM of controller 24.

$$\alpha_{dem}=-(Pmc \times K1) \quad (2)$$

where a negative value of acceleration $\alpha$ is a deceleration, and a negative value of torque T is a braking torque.

Target deceleration $\alpha_{dem}$ is not determined only by master-cylinder hydraulic pressure Pmc, which is a physical quantity demanded by a driver. For example, if the vehicle is equipped with an inter-vehicle distance control system and/or a cruise control system, target deceleration $\alpha_{dem}$ is determined upon taking account of a physical quantity of an automatic braking executed by the inter-vehicle distance control system and/or the cruise control system.

At step S5 controller 24 calculates a feedforward braking-torque command value Tdff (feedforward compensation quantity), which is necessary to realize target deceleration $\alpha_{dem}$ by the following manner. That is, controller 24 converts target deceleration $\alpha_{dem}$ to the braking torque using constant K2 determined from the vehicle specifications. Subsequently, feedforward braking-torque command value Tdff (feedforward compensation quantity) for target deceleration $\alpha_{dem}$ is obtained by filtering the braking torque corresponding to target deceleration $\alpha_{dem}$ through a characteristic $C_{FF}(s)$ of feedforward compensator (phase compensator) 51, which is represented by the following expression (3) and functions to correspond a response characteristic Pm(s) of a controlled object (vehicle) 54 to a characteristic Fref(s) of a reference model 52 in FIG. 4. Actually, feedforward braking-torque command value Tdff (feedforward compensation quantity) for target deceleration $\alpha_{dem}$ is calculated by discretizing the expression (3) by the same manner discussed above.

$$G_{FF}(s) = Fref(s)/Pm(s) \quad (3)$$

$$= (Tp \cdot s + 1)/(Tr \cdot s + 1) \quad (4)$$

where Tp is a time constant, and Tr is also a time constant.

At step S6 controller 24 determines whether or not a brake pedal operation is executed, by determining whether or not master-cylinder hydraulic pressure Pmc is greater than or equal to a small set value. When the determination at step S6 is affirmative, that is, when the brake pedal operation is executed, the program proceeds to step S7 wherein controller 24 calculates a feedback braking-torque command value Tdfb (feedback compensation quantity) for target deceleration $\alpha_{dem}$ and calculates a total braking-torque command value necessary to achieve target deceleration $\alpha_{dem}$ by the following manner.

Figure 4:
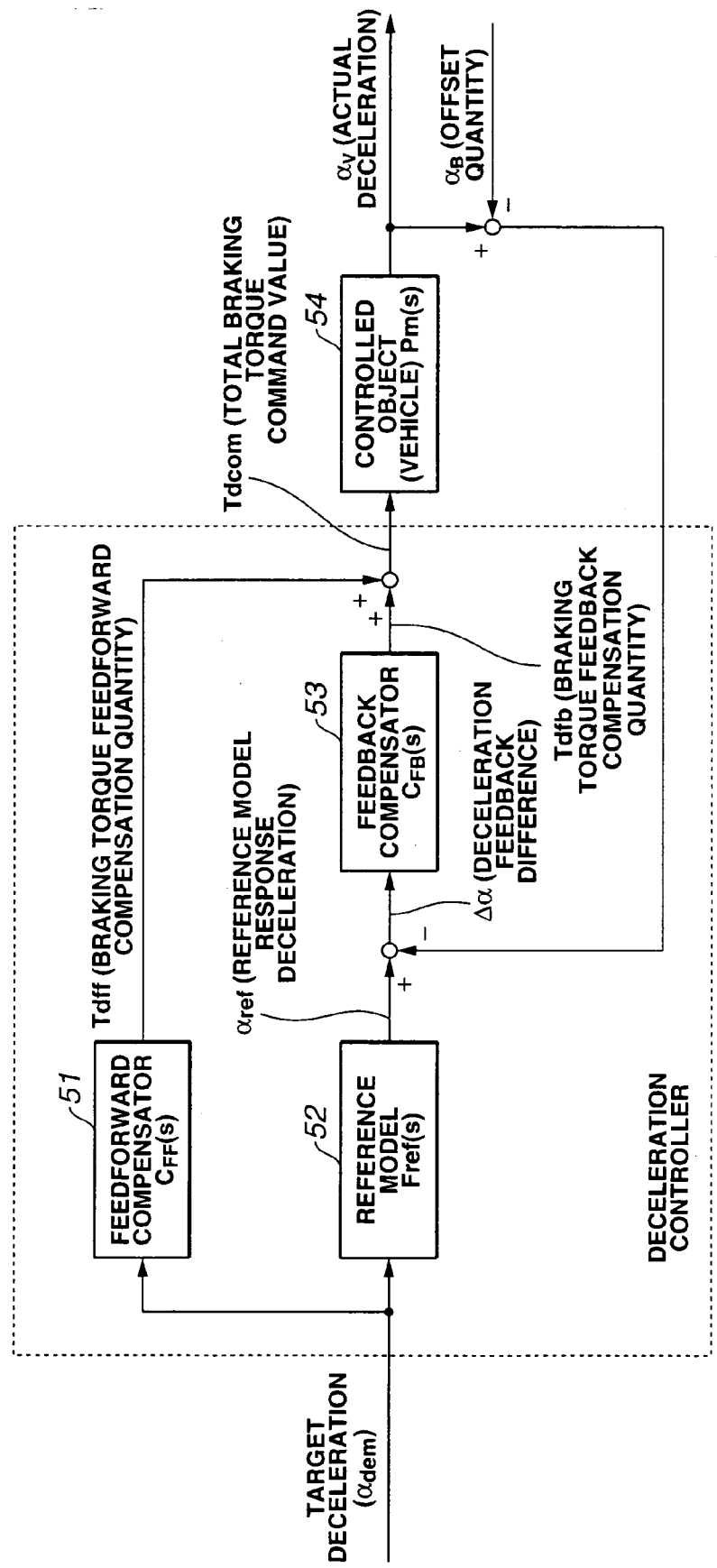
FIG. 4 is a block diagram showing a hydraulic controller for controlling a wheel cylinder hydraulic pressure in the first embodiment of the present invention.

A deceleration controller employed in the first embodiment according to the present invention is constructed by a two-degree-of-freedom control system, and comprises feedforward compensator 51, reference model 52 and feedback compensator 53 as shown in FIG. 4. Feedback compensator 53 achieves a close-loop performance such as the stability and the robustness of the control system, and feedforward compensator 51 achieves a responsibility to target deceleration $\alpha_{dem}$ as far as there is no model error.

In the calculation of feedback compensation quantity Tdfb, reference model response deceleration $\alpha_{ref}$ is first obtained by filtering target deceleration $\alpha_{dem}$ through the reference model 53 having a characteristic Fref(s) represented by the following expression (5).

$$Fref(s) = 1/(Tr \cdot s + 1) \quad (5)$$

Further, as shown in FIG. 4, a deceleration feedback difference $\Delta\alpha$ is obtained by subtracting a difference ($\alpha_v - \alpha_B$) of an actual deceleration $\alpha_v$ and an offset quantity $\alpha_B$ from reference model response deceleration $\alpha_{ref}$, as follows.

$$\Delta\alpha = \alpha_{ref} - (\alpha_v - \alpha_B) \quad (6)$$

Furthermore, feedback compensation quantity Tdfb is obtained by filtering deceleration feedback difference $\Delta\alpha$ through feedback compensator 53 having a characteristic $C_{FB}(s)$ represented by the following expression (7).

$$C_{FB}(s) = (Kp \cdot s + Ki)/s \quad (7)$$

In this first embodiment, this characteristic is achieved by a basic PI controller, and therefore control constants $K_p$ and $K_I$ thereof are determined upon taking account of a gain margin and a phase margin. Further, characteristics Fref(s) and $C_{FB}(s)$ are obtained by discretizing the expressions (5) and (7) by the same manner discussed above.

Subsequently, total braking-torque command value Tdcom is obtained by summing feedforward braking-torque command value Tdff (feedforward compensation quantity) for target deceleration $\alpha_{dem}$ and feedback braking-torque command value (feedback compensation quantity) Tdfb (Tdcom=Tdff+Tdfb), as shown in FIG. 4. With this series of executions at step S7, total braking-torque command value Tdcom is obtained. Therefore, step S7 in FIG. 3 corresponds to total braking-force command value determining means 31 in FIG. 2.

As far as controller 24 determines that the brake pedal is not depressed, that is, when the determination at step S6 is negative, the program proceeds to step S8 wherein controller 24 initializes an integral term in a PI controller by initializing braking-torque feedback compensation quantity Tdfb and a variable inside the digital filter represented by the expression (7).

At step S9 subsequent to the execution of step S7 or S8, controller 24 calculates a final regenerative braking-torque Tmlmt by executing a limiting operation of allowable maximum regenerative braking-torque Tmmax as follows.

Figure 5:
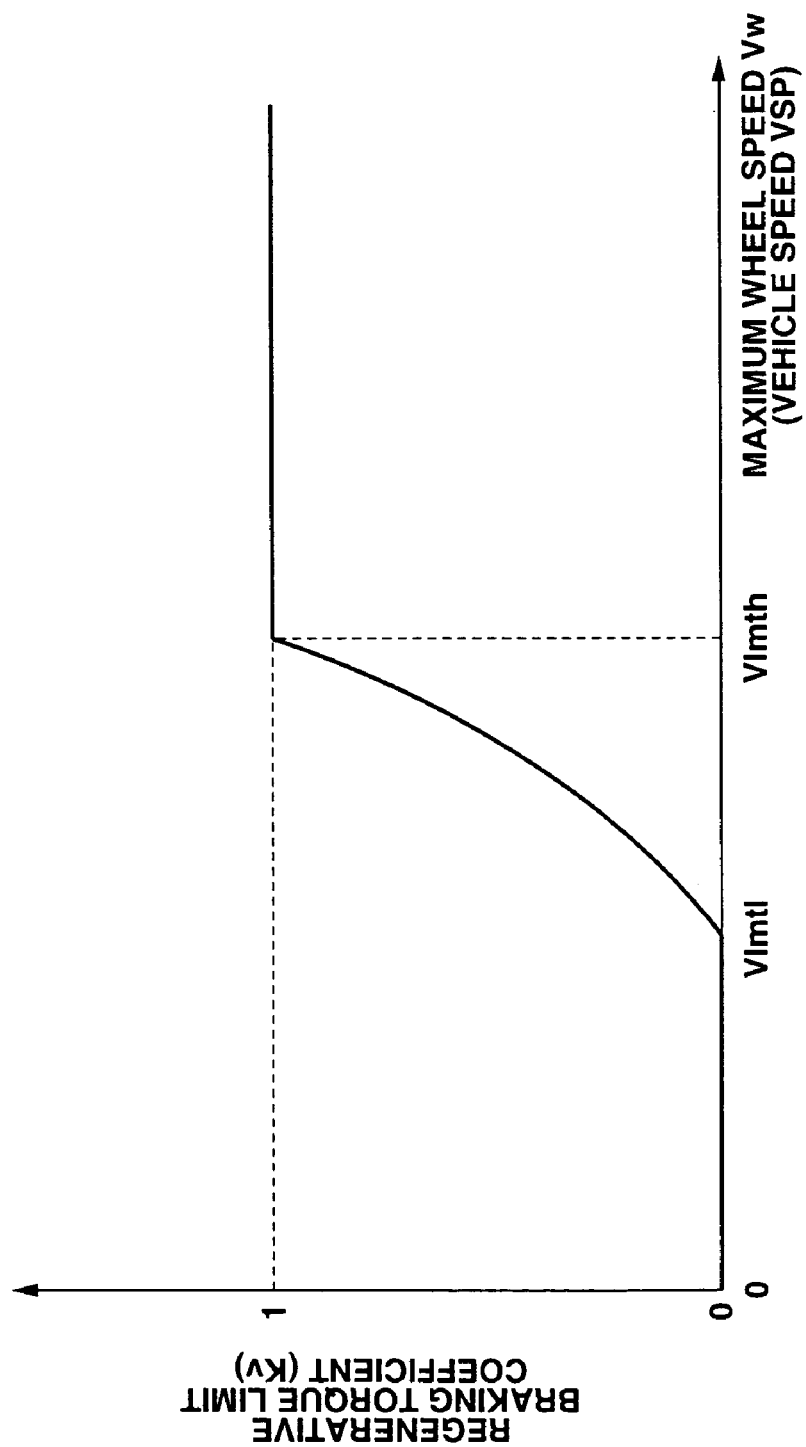
FIG. 5 is a graph showing a characteristic of a regenerative braking-torque limit coefficient relative to a wheel speed, employed in the first embodiment.

First, a regenerative braking-torque limit coefficient Kv determined according to maximum wheel speed Vw (vehicle speed VSP) as shown in FIG. 5. A regenerative braking-torque limit coefficient Kv monotonically decreases from 1 to 0 as vehicle speed VSP is decreased from a regenerative braking-torque limit start speed Vlmth to a regenerative braking-torque limit finish speed Vlmtl as shown in FIG. 5. By multiplying allowable maximum regenerative braking-torque Tmmax and regenerative braking-torque limit coefficient Kv, final regenerative braking-torque Tmlmt is obtained so as to limit allowable maximum regenerative braking-torque (Tmlmt=Tmmax×Kv).

That is, regenerative braking-torque limit coefficient Kv limits allowable maximum regenerative braking-torque Tmmax such that a separation of the actual value relative to the hydraulic braking-torque command value is maintained within a range where a shortage of the vehicle deceleration generated thereby does not cause a problem even when a response (generation) delay of the hydraulic braking torque is caused during a period that vehicle speed VSP is decreased from regenerative braking-torque limit start speed Vlmth to regenerative braking-torque limit finish speed Vlmt1. This period corresponds to a changeover period where the regenerative braking is changed to the hydraulic friction braking.

Although controller 24 calculates final regenerative braking-torque Tmlmt from allowable maximum regenerative braking-torque Tmmax and regenerative braking-torque limit coefficient Kv (Tmlmt=Tmmax×Kv) at step S9, due to the limitation of regenerative braking-torque limit coefficient Kv as discussed above, final regenerative braking-torque Tmlmt performs such that the separation of the actual value relative to the hydraulic braking-torque command value does not cause a problem of the shortage of the vehicle deceleration even when the increase response delay of the hydraulic braking-torque is caused. That is, step S9 corresponds to regenerative braking-torque limiting means 32 in FIG. 2.

At step S10 controller 24 distributes (divides) final regenerative braking-torque Tmlmt into a low-frequency component (normal control) regenerative braking-torque limit value Tmmaxl and a high-frequency component (transient correction control) regenerative braking-torque limit value Tmmaxh. More specifically, controller 24 obtains low-frequency component (normal control) regenerative braking-torque limit value Tmmaxl and a high-frequency component (transient correction control) regenerative braking-torque limit value Tmmaxh using a distribution ratio Kkato ranging from 0 to 1 ($0 \leq Kkato \leq 1$) from the following expressions (8).

$$Tmmaxl = Tmlmt \times Kkato$$

$$Tmmaxh = Tmlmt \times (1 - Kkato) \quad (8)$$

At step S11 controller 24 distributes (divides) total braking-torque command value Tdcom into a target braking-torque high-frequency component Tdcomh and a target braking-torque low-frequency component Tdcoml. In FIG. 2, target braking-torque high-frequency component Tdcomh and target braking-torque low-frequency component Tdcoml are represented as outputs of calculating means 31 for convenience in writing. More specifically, controller 24 obtains target braking-torque high-frequency component Tdcomh by filtering total braking-torque command value Tdcom through a high-pass filter having a characteristic Fhpf(s) represented by the following expression (9).

$$Fhpf(s)=Thp \cdot s/(Thp \cdot s+1) \tag{9}$$

Actually, this calculation is executed on the basis of a recurrence formula obtained by discretizing characteristic Fhpf(s). High-frequency component (transient correction control) regenerative braking-torque limit value Tmmaxh obtained at step S10 is treated as an upper limit of this obtained target braking-torque high-frequency component Tdcomh. Controller 24 further obtains target braking-torque low-frequency component Tdcomh by subtracting target braking-torque high-frequency component Tdcomh from total braking-torque command value Tdcom as represented by the following expression (10).

$$Tdcoml=Tdcom-Tdcomh \tag{10}$$

At step S12 controller 24 distributes target braking-torque low-frequency component Tdcoml into regenerative braking toque command value Tmcom and hydraulic braking-torque command value Tbcom for regenerative coordination brake control. Therefore, step S12 corresponds to hydraulic braking-torque and regenerative braking-torque distributing means 33 in FIG. 2.

In this first embodiment according to the present invention, the distribution thereof is executed so as to consume target braking-torque low-frequency component Tdcoml as possible, in order to improve fuel consumption. Further, hydraulic braking-torque command value Tbcom is distributed to the front wheel (driving wheel) side and the rear wheel (driven wheel) side.

Further, since the first embodiment according to the present invention has been shown and described such that motor 4 for regenerative braking is connected only to front wheels 1 acting as driving wheels, there are occurred Mode 1 and Mode 2 where normal front and rear braking-torque distribution is maintained, and Mode 3 and Mode 4 where normal front and rear distribution of the braking-torque cannot be maintained.

Figure 6:
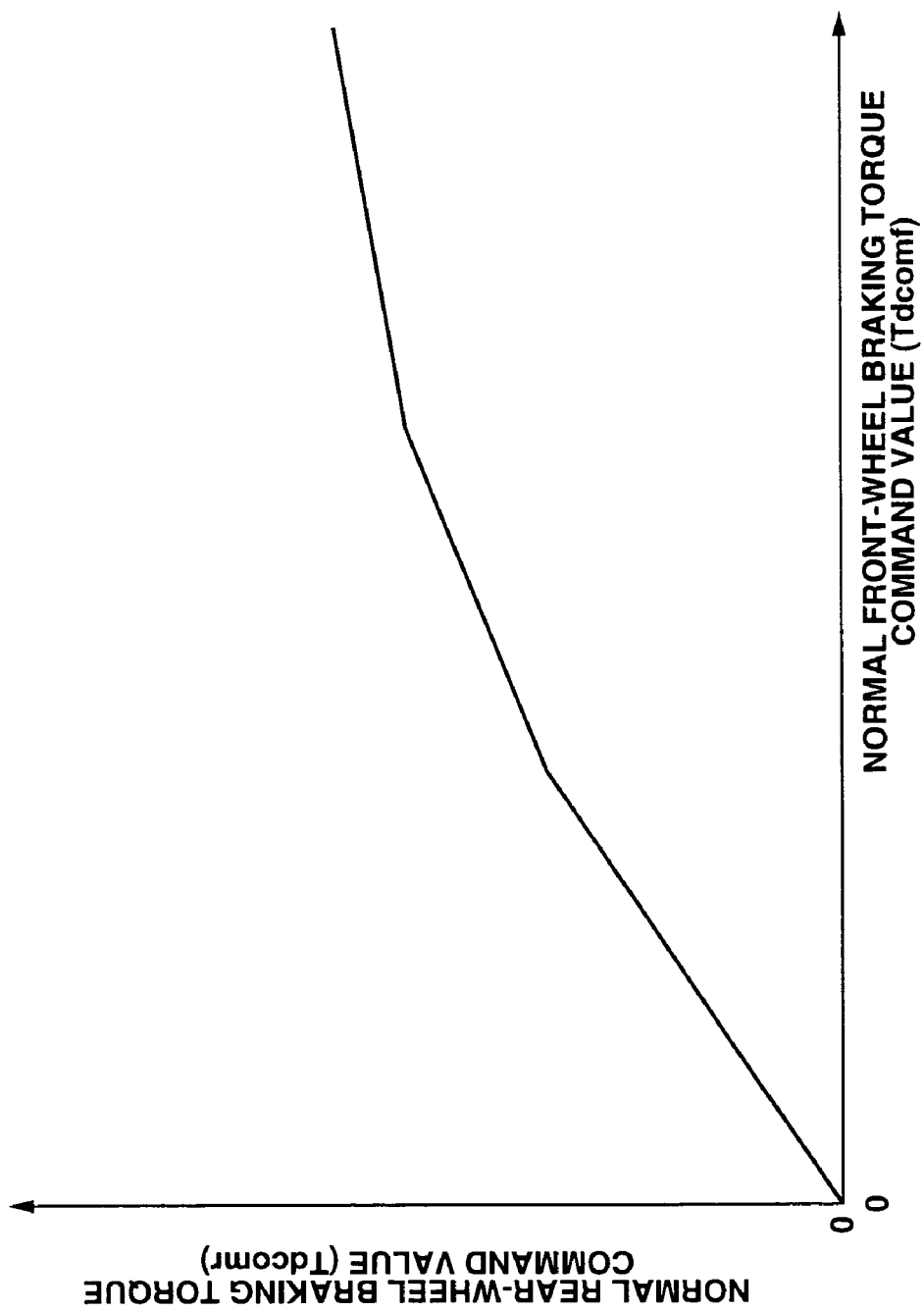
FIG. 6 is a graph showing a normal distribution characteristic of a braking torque to front and rear wheels, employed in the first embodiment.

First, normal front-wheel braking-torque command value Tdcomf and the normal rear-wheel braking-torque command value Tdcomr are obtained by normally distributing total braking-torque command value Tdcom to the front wheel side and the rear wheel side on the basis of the map data shown in FIG. 6 which has been previously stored in ROM of controller 24. The normal front and rear braking-torque distribution is a front and rear braking force (torque) distribution characteristic which is a reference value when the regenerative braking is not executed, and has been determined upon taking account of the rear-wheel lock avoidance, the stability of the vehicle behavior, and the shortening of the braking distance which are caused by the weight movement between front and rear wheels during the braking operation.

Hereinafter, the coordinated brake control is executed by obtaining a front-wheel hydraulic pressure braking-torque command value Tbcomf, a rear-wheel hydraulic pressure braking-torque command value Tbcomr and a regenerative braking-torque command value Tmcom by each Mode, as follows.

[Mode 4]
When Tmmaxl≦(Tdcomf+Tdcomr), only the regenerative braking is employed as expressed by the following expressions (11A):

$$Tbcomf=0,$$

$$Tbcomr=0, \text{ and}$$

$$Tmcom=Tdcomf+Tdcomr. \tag{11A}$$

[Mode 3]
When (Tdcomf+Tdcomr)<Tmmaxl≦Tdcomf, the regenerative braking and the rear wheel hydraulic braking are employed as expressed by the following expressions (11B):

$$Tbcomf=0$$

$$Tbcomr=Tdcomf+Tdcomr-Tmmaxl \text{ and}$$

$$Tmcom=Tmmaxl. \tag{11B}$$

[Mode 2]
When Tdcomf<Tmmaxl≦(small set value), the regenerative braking and the front and rear wheel hydraulic braking are employed as expressed by the following expressions (11C):

$$Tbcomf=Tdcomf-Tmmaxl,$$

$$Tbcomr=Tdcomr, \text{ and}$$

$$Tmcom=Tmmaxl. \tag{11C}$$

[Mode 1]
When other case except for the above Modes 4, 3 and 2, only the front and rear hydraulic braking is employed as expressed by the following expressions (11D):

$$Tbcomf=Tdcomf,$$

$$Tbcomr=Tdcomr, \text{ and}$$

$$Tmcom=0. \tag{11D}$$

At step S13 controller 24 calculates final regenerative braking-torque command value Tmcom2 by adding target braking-torque high-frequency component Tdcomh obtained at step S12 to regenerative braking-torque command value Tmcom obtained at step S12 as represented by the following expression (12).

$$Tmcom2=Tmcom+Tdcomh \tag{12}$$

At step S14 controller 24 calculates wheel-cylinder hydraulic pressure command values Pbcomf and Pbcomr for front and rear wheels using a constant K3 on the basis of front and rear wheel hydraulic braking toque command values Tbcomf and Tbcomr, from the following expressions (13).

$$Pbcomf=-(Tbcomf \times K3)$$

$$Pbcomr=-(Tbcomr \times K3) \tag{13}$$

where K3 is the constant determined from the vehicle specifications previously stored in ROM.

At step S15 controller 24 outputs final regenerative braking-torque command value Tmcom2 to motor torque controller 21 and front and rear wheel-cylinder hydraulic command values Pbcomf and Pbcomr to hydraulic brake controller 18.

Motor torque controller 21 controls motor 4 through inverter 22 to bring the actual regenerative torque closer to corrected regenerative braking-torque Tmcom'. Hydraulic brake controller 18 controls solenoid values 13, 14 and 16 to bring the actual front and rear hydraulic braking-torques closer to front and rear wheel-cylinder hydraulic command values Pbcomf and Pbcomr, respectively.

Figure 7A:
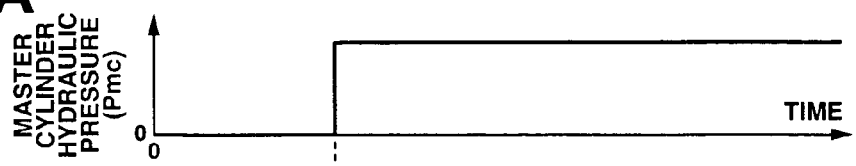
FIGS. 7A through 7E are time charts showing a coordinated brake control operation achieved by the arrangement shown in FIGS. 2 and 3.
Figure 7B:
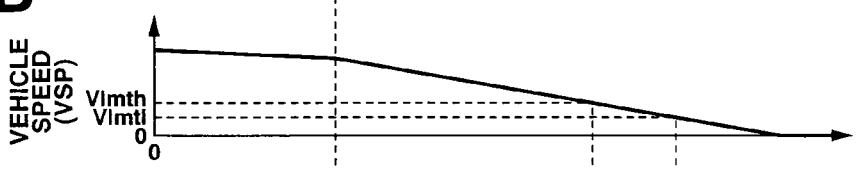
Figure 7C:
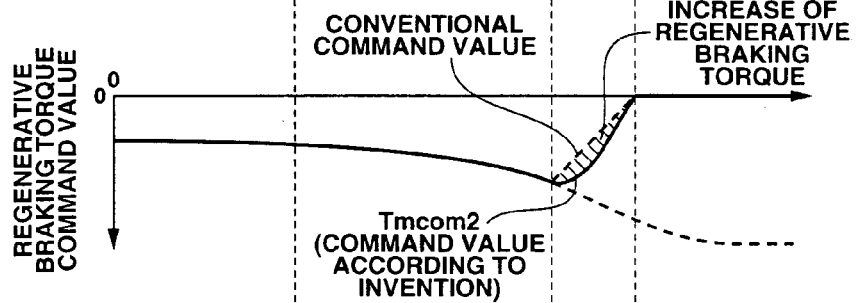

With the coordinated brake control system according to the first embodiment of the present invention, final regenerative braking-torque Tmlmt (Tmlmt=Tmmax×Kv) set in the limited value is obtained by multiplying allowable maximum regenerative braking-torque Tmmax and regenerative braking-torque limit coefficient Kv at step S9, final regenerative braking-torque command value Tmcom2 is obtained on the basis of the obtained final regenerative braking-torque Tmlmt at step S13. Therefore, final regenerative braking-torque command value Tmcom2 functions, as shown in FIGS. 7A through 7E and particularly in FIG. 7C, to suppress the rate of lowering of the regenerative braking-torque command value by a quantity shown by hatching which is a difference between the regenerative braking force command value according to the first embodiment of the present invention and a conventional command value denoted by a broken line, during a period from a moment t2 to a moment t3 where vehicle speed VSP is lowered from regenerative braking-torque limit starting speed Vlmth to regenerative braking-torque limit starting speed Vlmtl. In other words, the regenerative braking torque varies to form a quadric curve from allowable maximum regenerative braking-toque Tmmax taken at a regenerative braking-torque limit start speed Vlmth toward zero, when vehicle speed VSP is varied from regenerative braking-torque limit start speed Vlmth to a regenerative braking-torque limit finish speed Vlmtl as shown in FIG. 7C.

Figure 7D:
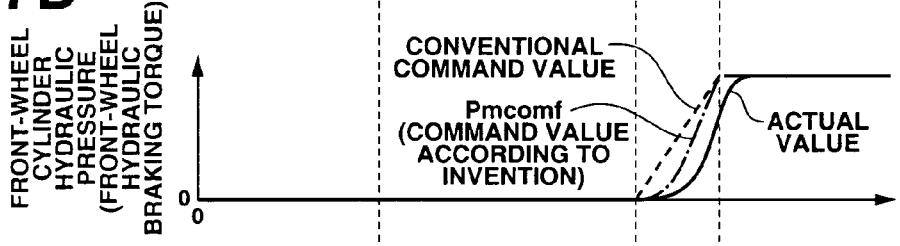

The operation shown in FIGS. 7A through 7E is executed under a condition as same as that of the operation shown in FIGS. 12A through 12E. Accordingly, the regenerative braking torque is increased by a quantity shown by the hatching as compared with the conventional regenerative braking torque, and therefore the increase of the wheel-cylinder hydraulic pressure command value, which is denoted by a dot and dash line in FIG. 7D, is suppressed.

Figure 7E:
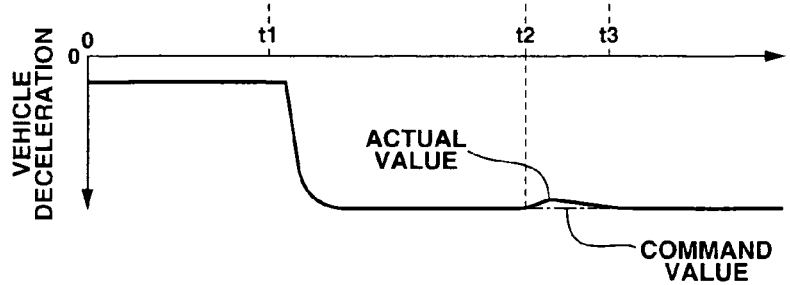
Figure 8A:
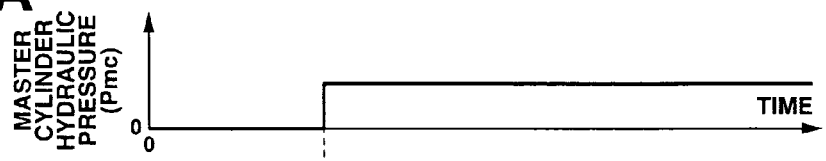
FIGS. 8A through 8E are time charts showing the coordinated brake control operation achieved by the arrangement shown in FIGS. 2 and 3 in case that the vehicle is slowly decelerated.
Figure 8B:
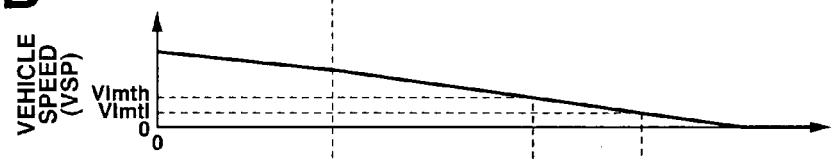
Figure 8C:
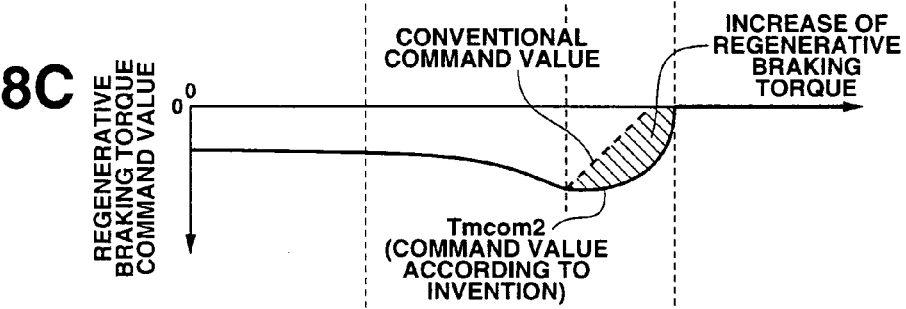
Figure 8D:
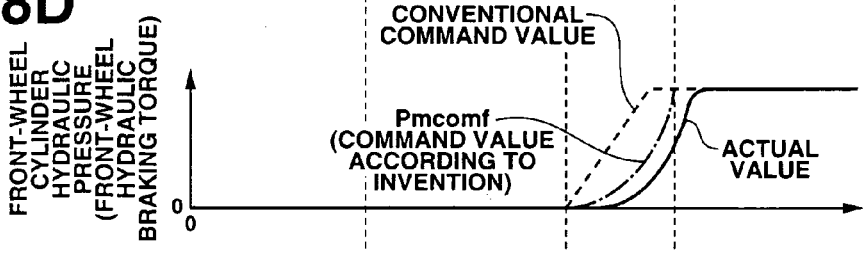
Figure 8E:
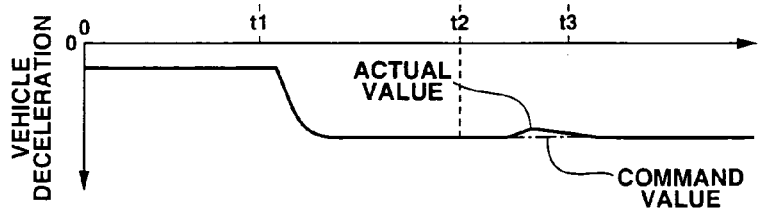
Figure 9A:
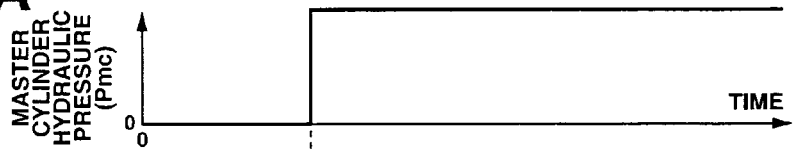
FIGS. 9A through 9E are time charts showing the coordinated brake control operation achieved by the arrangement shown in FIGS. 2 and 3 in case that the vehicle is quickly decelerated.
Figure 9B:
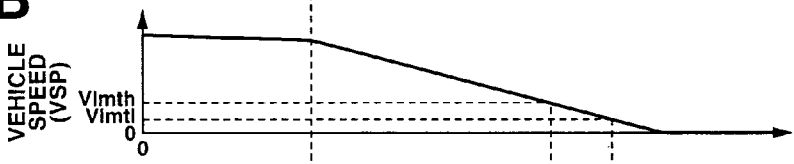
Figure 9C:
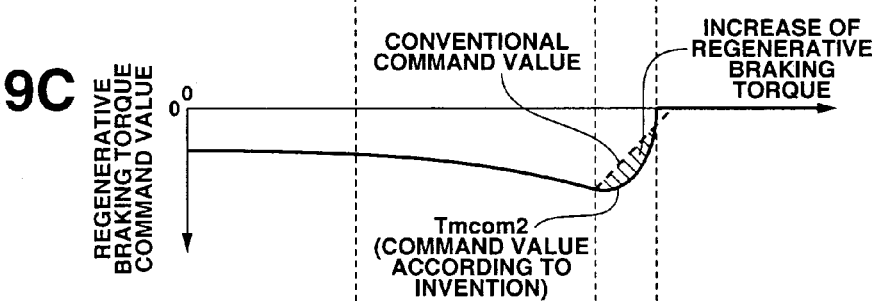
Figure 9D:
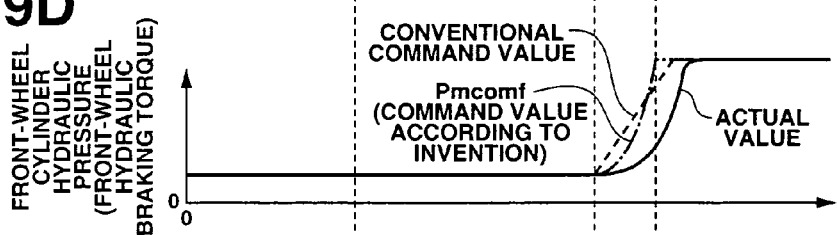
Figure 9E:
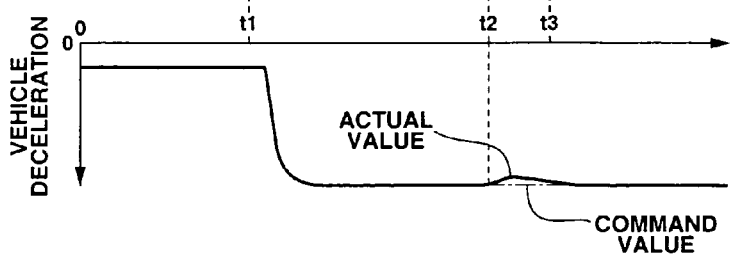

Therefore, as is apparent from the change of vehicle deceleration shown by a continuous line in FIG. 7E, the response delay of the friction braking torque by the wheel-cylinder hydraulic pressure during the changeover period from the regenerative braking to the hydraulic friction braking does not derive the large shortage of the vehicle deceleration. This enables the smooth changeover from the regenerative braking to the hydraulic friction braking without generating the shortage of the vehicle deceleration, and thereby enabling the reliable and comfortable braking so as not to apply a strange feeling to a driver.

Further, since the regenerative braking toque is increased by a quantity shown by the hatching, the recovery of the regenerative energy is improved, and therefore the energy efficiency of the system is also improved.

Furthermore, since the first embodiment according to the present invention has been arranged to calculate final regenerative braking-torque command value Tmcom2 by multiplying regenerative braking-torque limit coefficient Kv shown in FIG. 5 and allowable maximum regenerative braking-torque Tmmax (Tmlmt=Tmmax×Kv), the advantage of the present invention is achieved by simple arrangement employing a map retrieval and a calculation.

Further, as apparent from time charts in FIGS. 8A through 8E and 9A through 9E, where FIGS. 8A through 8E show an operation during a slow deceleration of the first embodiment, and FIGS. 8A through 9E show an operation during a quick deceleration of the first embodiment, the vehicle deceleration is terminated by firmly setting final regenerative braking-torque command value Tmcom2 at 0 when vehicle speed VSP becomes regenerative braking-torque limit finish speed Vlmtl regardless of the state of the vehicle deceleration. Simultaneously, a changeover from the regenerative braking to the friction braking is completed by setting the command value Pbcomf of the wheel-cylinder hydraulic pressure (friction braking-torque) at a controlled maximum value.

Referring to FIGS. 10A through 10E, there is discussed a second embodiment of the coordinated brake control system according to the present invention. The second embodiment is basically the same as the first embodiment except that regenerative braking-torque limit coefficient Kv is set so as to linearly decrease from 1 to 0 in correspond to a change of vehicle speed VSP from regenerative braking-torque limit start speed Vlmth to regenerative braking-torque limit finish speed Vlmtl. That is, regenerative braking-torque limit coefficient Kv is defined according to vehicle speed VSP as follows.

When VSP≧Vlmth, Kv=1.
When Vlmtl≦VSP<Vlmth,
Kv={VSP/(Vlmth−Vlmtl)}−{Vlmtl/(Vlmth−Vlmtl)}.
When VSP<Vlmtl, Kv=0.

Figure 10A:
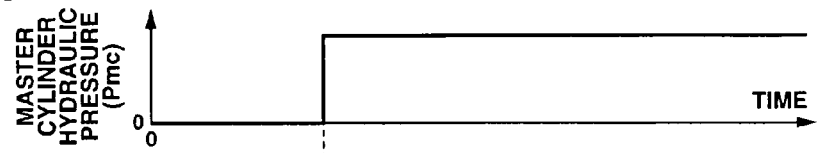
FIGS. 10A through 10E are time charts showing a coordinated brake control operation achieved by a second embodiment shown in FIGS. 2 and 3.
Figure 10B:
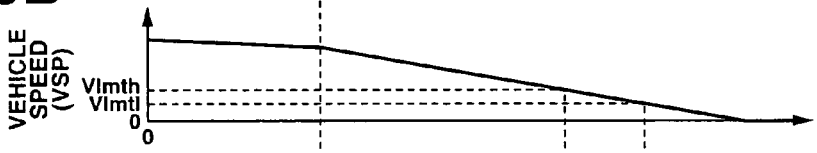
Figure 10C:
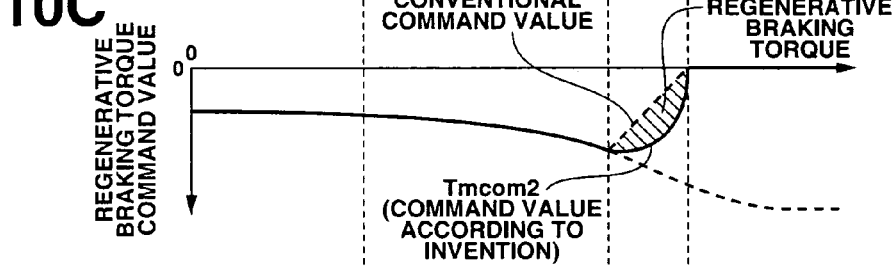
Figure 10D:
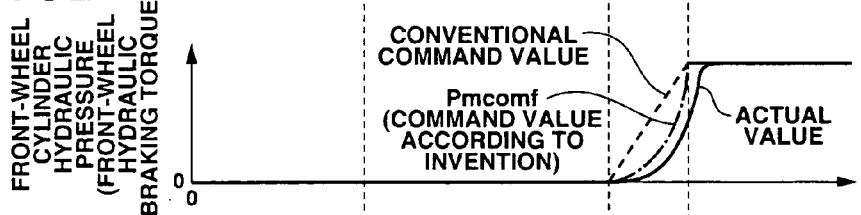
Figure 10E:
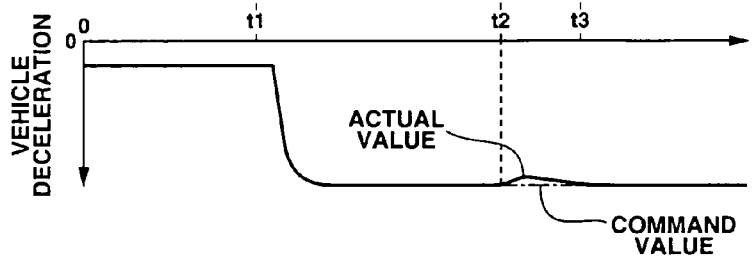

When final regenerative braking-torque Tmlmt is obtained by multiplying allowable maximum regenerative braking-torque Tmmax and regenerative braking-torque limit coefficient Kv (Tmlmt=Tmmax×Kv) and when the obtained final generative braking-torque Tmlmt is employed for the calculation of final regenerative braking-torque command value Tmcom2, as shown in FIGS. 10A through 10E, particularly in FIG. 10C, the degree of decrease of the regenerative torque at the moment t2 from when the changeover (transition) from the regenerative braking to the friction braking is started. Therefore, the increase of the wheel cylinder hydraulic pressure (friction braking-torque) command value Pbcomf during a short period just after the moment t2 is suppressed. Consequently, the coordinated brake control system of the second embodiment prevents the actual wheel cylinder pressure from largely separating from the wheel cylinder pressure command value regardless of the large delay of the actual wheel cylinder hydraulic pressure during a short period just after the moment t2. This prevents a problem of temporally causing a shortage of the vehicle deceleration.

Figure 11A:
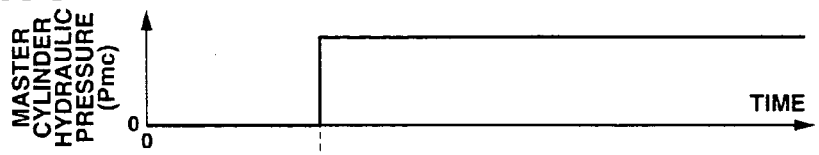
FIGS. 11A through 11E are time charts showing a coordinated brake control operation achieved by a third embodiment shown in FIGS. 2 and 3.
Figure 11B:
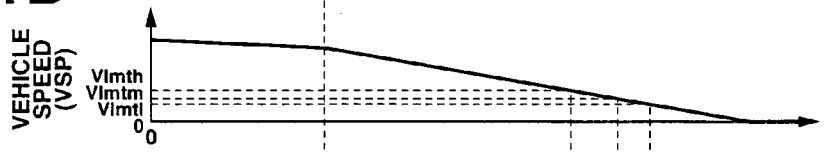
Figure 11C:
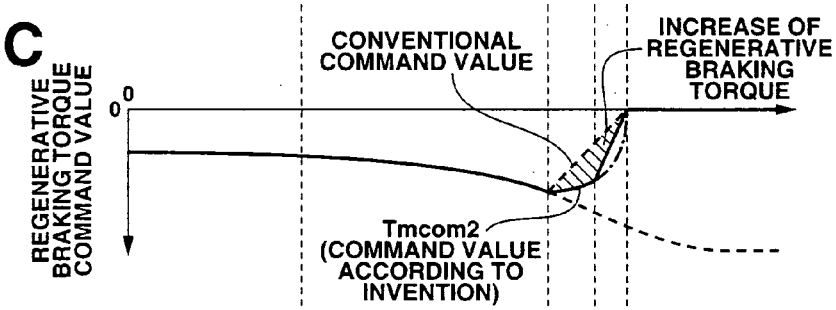
Figure 11D:
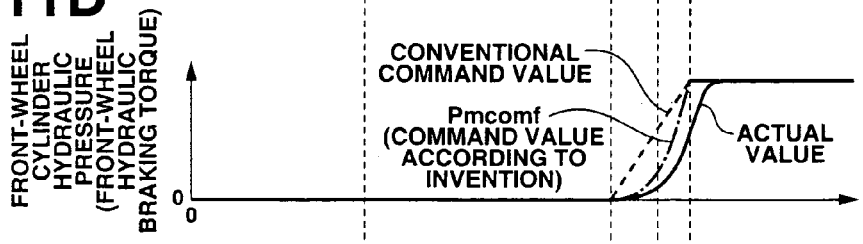
Figure 11E:
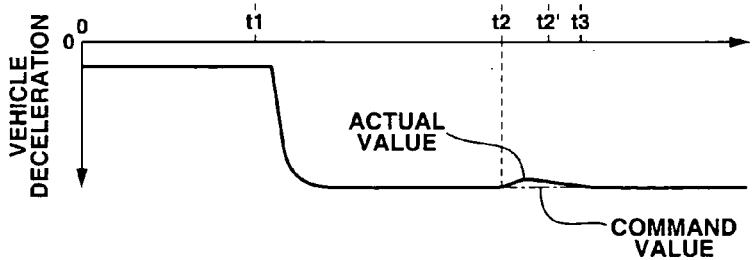
Figure 12A:
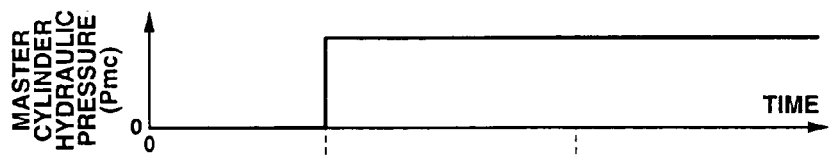
FIGS. 12A through 12E are time charts showing a coordinated brake control operation achieved by a coordinated brake control of a related art.
Figure 12B:
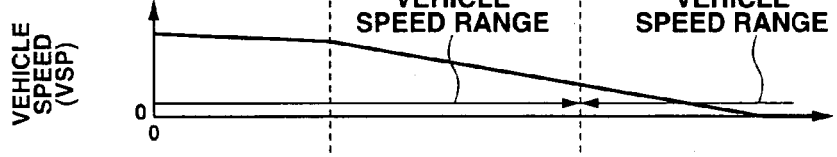
Figure 12C:
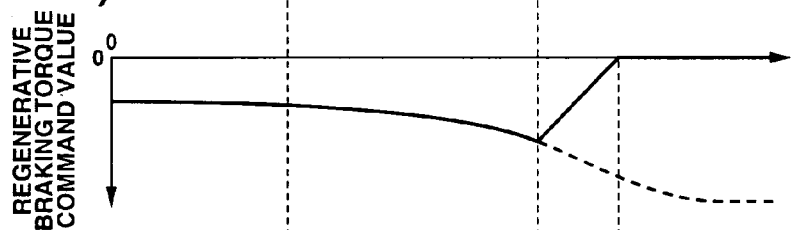
Figure 12D:
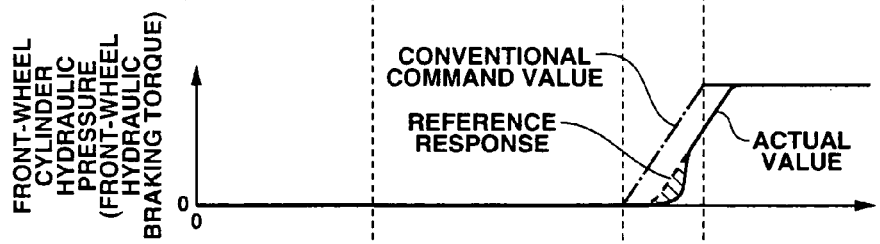
Figure 12E:
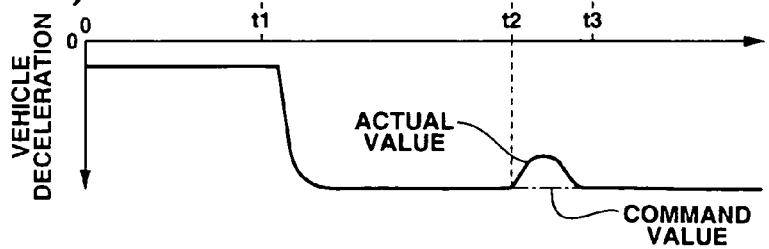

Referring to FIGS. 11A through 1E, there is discussed a third embodiment of the coordinated brake control system according to the present invention. The third embodiment is basically the same as the first embodiment except that during the first half of the changeover period the final regenerative braking-torque Tmlmt is calculated by the same manner of the second embodiment and that during the second half of the changeover period the changeover period the final regenerative braking-torque Tmlmt is calculated by multiplying an allowable maximum middle regenerative braking-torque Tmmaxm taken at a limit middle speed Vlmtm and regenerative braking-torque limit coefficient Kv (Tmlmt=Tmmax×Kv).

More specifically, final regenerative braking-torque Tmlmt is calculated such that regenerative braking-torque limit coefficient Kv is set so as to linearly decrease from 1 to 0 as is similar to the second embodiment of the present invention. Then, when vehicle speed VSP is within regenerative braking-torque limit start speed Vlmth and a regenerative braking-torque limit middle speed Vlmtm, final regenerative braking-torque Tmlmt is obtained by multiplying allowable maximum regenerative braking-torque Tmmax and regenerative braking-torque limit coefficient Kv (Tmlmt=Tmmax×Kv). Further, when vehicle speed VSP is lower than regenerative braking-torque limit middle speed Vlmtm, final regenerative braking-torque Tmlm is obtained by multiplying maximum allowable middle regenerative braking-torque Tmmaxm at regenerative braking-torque limit middle speed Vlmtm and regenerative braking-torque limit coefficient Kv (Tmlmt=Tmmaxm×Kv).

By this arrangement of the third embodiment according to the present invention, as shown by the time charts in FIGS. 11A through 11E, during the first-half period from the moment t2 to a moment t2' when vehicle speed VSP is lowered from regenerative braking-torque limit start speed Vlmth to regenerative braking-torque limit middle speed Vlmtm, final regenerative braking-torque Tmlmt takes a value as same as that in the second embodiment. Therefore, the same advantage obtained by the second embodiment is also ensured by the third embodiment during the first-half period from moment t2 to moment t2'.

Further, the third embodiment according to the present invention is arranged such that during the second-half period from moment t2' to a moment t3 when vehicle speed VSP is lowered from regenerative braking-torque limit middle speed Vlmtm to regenerative braking-torque limit finish speed Vlmtl, final regenerative braking-torque Tmlmt is obtained by multiplying allowable maximum middle regenerative braking-torque Tmmaxm and regenerative braking-torque limit coefficient Kv (Tmlmt=Tmmaxm×Kv). Therefore, final regenerative braking-torque Tmlmt is linearly decreased as shown by a continuous line in FIG. 11C, and the command value Pbcomf of wheel cylinder hydraulic pressure (friction braking-torque) is linearly increased according to the linear decrease of the regenerative braking torque. This change rate of final regenerative braking-torque command value Tmcom2 and the change rate of the wheel cylinder hydraulic pressure command value Pbcomf during the period from t2' to t3 become greater than those in the second embodiment.

Since the increase of the wheel cylinder hydraulic pressure has already started during the period from t2' to t3, the response delay of the friction braking torque by the actual hydraulic pressure is small. Therefore, the large change rate of the wheel cylinder hydraulic pressure command value Pbcomf corresponds to this actual change during the period from t2' to t3.

Accordingly, the third embodiment according to the present invention is capable of corresponding the rate of change of the wheel cylinder hydraulic pressure command value Pbcomf with a response delay of the friction braking torque throughout the changeover period from the regenerative braking torque to the friction braking torque (corresponding to a period from the moment t2 to the moment t3 during when vehicle speed VSP is decreased from regenerative braking-torque limit start speed Vlmth to regenerative braking-torque limit finish speed Vlmtl). This enables the total braking-torque to be brought closer to a target braking torque even during the changeover period, and removes a strange feeling caused by a shortage of the deceleration or the change of the deceleration of the vehicle throughout the changeover period from the moment t2 to the moment t3.

This application is based on prior Japanese Patent Application No. 2002-365210. The entire contents of the Japanese Patent Application No. 2002-365210 with a filing date of Dec. 17, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A coordinated brake control system for a hybrid brake system including a regenerative brake unit and a friction brake unit for a vehicle, the coordinated braking control system comprising:
   a controller arranged,
      to generate a total braking torque which is a combination of a regenerative braking torque generated by the regenerative brake unit and a friction braking torque generated by the friction brake unit, so as to bring the total braking-torque closer to a target braking torque, and
      to limit a rate of change of the regenerative braking torque according to a response delay of the friction braking torque when a first distribution ratio of the generative braking torque relative to the total braking torque is decreased and when a second distribution ratio of the friction braking torque relative to the total braking torque is increased.

2. The coordinated brake control system as claimed in claim 1, wherein the controller is further arranged to obtain the regenerative braking torque by multiplying an allowable maximum regenerative braking-torque and a regenerative braking torque limit coefficient (Kv) which monotonically decreases from 1 to 0 as a vehicle speed is decreased from a limit start speed to a limit finish speed lower than the limit start speed, when the rate of change of the regenerative braking torque is limited.

3. The coordinated brake control system as claimed in claim 2, wherein the regenerative braking-torque limit coefficient Kv is defined according to vehicle speed VSP relative to a limit start speed Vlmth and a limit finish speed Vlmtl as follows.
   When VSP≧Vlmth, Kv=1.
   When Vlmtl≦VSP<Vlmth,
   Kv={VSP/(Vlmth−Vlmtl)}−{Vlmtl/(Vlmth−Vlmtl)}.
   When VSP≦Vlmtl, Kv=0.

4. The coordinated brake control system as claimed in claim 1, wherein the controller is further arranged to obtain the regenerative braking torque by multiplying an allowable maximum regenerative braking-torque and a regenerative braking-torque limit coefficient which monotonically decreases from 1 to 0 as a vehicle speed is decreased from a limit start speed to a limit finish speed lower than the limit start speed, when the vehicle speed is within a range from the limit start speed to a limit middle speed between the limit start speed and the limit finish speed, and to obtain the regenerative braking torque by multiplying the allowable maximum regenerative braking-torque taken at the limit middle speed and the regenerative braking torque limit coefficient, when the vehicle speed is within a range from the limit middle speed to the limit finish speed.

5. The coordinated brake control system as claimed in claim 1, wherein the regenerative braking torque varies to form a quadric curve from an allowable maximum regenerative braking-toque taken at a limit start speed toward zero, when the rate of change of the first regenerative braking torque is limited.

6. The coordinated brake control system as claimed in claim 1, wherein the controller is further arranged to calculate the target braking torque based on a braking intent.

7. A coordinated brake control system for a vehicle comprising:
- a vehicle braking detector detecting a braking intent of a driver;
- a regenerative brake unit that generates a regenerative braking torque;
- a friction braking unit that generates a friction braking torque; and
- a controller connected to the vehicle braking detector, the regenerative braking unit and the friction brake unit, the controller being arranged,
- to determine a target braking torque according to the braking intent,
- to calculate first and second distribution ratios which represents distribution ratios of the total braking torque to the regenerative brake unit and the friction brake unit, respectively,
- to generate a total braking torque by dividedly producing the regenerative braking torque and the friction braking torque generated by the friction brake unit on the basis of the first and second distribution ratios, so as to bring the total braking torque closer to the target braking torque, and
- to limit a rate of change of the regenerative braking torque according to a generation delay characteristic of the friction braking torque during a period when the first distribution ratio is decreased and the second distribution ratio is increased.

8. A method of controlling a hybrid brake system including a regenerative brake unit and a friction brake unit for a vehicle, the method comprising:
- generating a total braking torque which is a combination of a regenerative braking torque generated by the regenerative brake unit and a friction braking torque generated by the friction brake unit, so as to bring the total braking-torque closer to a target braking torque; and
- limiting a rate of change of the regenerative braking torque according to a response delay of the friction braking torque when a first distribution ratio of the generative braking torque relative to the total braking torque is decreased and when a second distribution ratio of the friction braking torque relative to the total braking torque is increased.

* * * * *